(12) United States Patent
Iyoha et al.

(10) Patent No.: US 10,273,178 B2
(45) Date of Patent: Apr. 30, 2019

(54) UPWARDLY ANGLED BURNERS IN GLASS FURNACES

(71) Applicants: Osemwengie Uyi Iyoha, Amherst, NY (US); Hisashi Kobayashi, Bedford, NY (US); Euan J. Evenson, Burlington (CA)

(72) Inventors: Osemwengie Uyi Iyoha, Amherst, NY (US); Hisashi Kobayashi, Bedford, NY (US); Euan J. Evenson, Burlington (CA)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 69 days.

(21) Appl. No.: 14/970,907

(22) Filed: Dec. 16, 2015

(65) Prior Publication Data

US 2016/0176744 A1 Jun. 23, 2016

Related U.S. Application Data

(60) Provisional application No. 62/095,999, filed on Dec. 23, 2014.

(51) Int. Cl.
*C03B 5/235* (2006.01)
*C03B 5/04* (2006.01)

(52) U.S. Cl.
CPC ............. *C03B 5/2353* (2013.01); *C03B 5/04* (2013.01); *C03B 5/235* (2013.01); *C03B 2211/60* (2013.01); *Y02P 40/57* (2015.11)

(58) Field of Classification Search
CPC . C03B 5/2353; C03B 5/2356; C03B 2207/60; C03B 2207/64
See application file for complete search history.

(56) References Cited

U.S. PATENT DOCUMENTS

| | | |
|---|---|---|
| 1,894,249 A | 1/1933 | Williams |
| 3,837,832 A | 9/1974 | Pecoraro et al. |
| 5,609,481 A | 3/1997 | Kobayashi |
| 5,628,809 A | 5/1997 | Kobayashi |
| 5,961,689 A | 10/1999 | Kobayashi et al. |
| 6,132,204 A | 10/2000 | Snyder et al. |
| 6,203,314 B1* | 3/2001 | Philippe ............... F23C 7/02 431/10 |
| 6,253,578 B1* | 7/2001 | Kobayashi ........... C03B 5/2353 65/134.4 |
| 7,946,129 B2* | 5/2011 | Wu ....................... C03B 5/167 65/134.1 |
| 8,256,245 B2 | 9/2012 | Tsiava |
| 8,904,824 B2* | 12/2014 | Douxchamps ........... C03B 5/04 65/134.6 |
| 2006/0057517 A1 | 3/2006 | Joshi et al. |
| 2008/0115535 A1* | 5/2008 | Wu ....................... C03B 5/167 65/134.4 |

(Continued)

FOREIGN PATENT DOCUMENTS

JP S55049130 9/1980
JP H11193907 A 7/1999
(Continued)

*Primary Examiner* — Gregory A Wilson
(74) *Attorney, Agent, or Firm* — Donald T. Black

(57) ABSTRACT

A glassmelting furnace is provided in which the burners are elevated above the glassmelt surface and are oriented at an angle upwards relative to the glassmelt surface.

5 Claims, 3 Drawing Sheets

(56) References Cited

U.S. PATENT DOCUMENTS

| | | | |
|---|---|---|---|
| 2010/0104990 A1 | 4/2010 | Sarmiento-Darkin et al. | |
| 2010/0300153 A1* | 12/2010 | Zhang | C03B 5/2353 65/135.9 |
| 2011/0185769 A1 | 8/2011 | Wu et al. | |
| 2012/0058419 A1* | 3/2012 | Maida | C03B 19/1423 430/5 |
| 2013/0137055 A1* | 5/2013 | Hirano | F23C 5/28 432/196 |
| 2014/0170573 A1* | 6/2014 | Simpson | F23D 14/24 431/12 |

FOREIGN PATENT DOCUMENTS

| | | |
|---|---|---|
| JP | 2011-089730 A | 5/2011 |
| JP | 2012-121762 A | 6/2012 |
| JP | 2013170741 A | 9/2013 |
| WO | WO2009/092950 A2 | 7/2009 |

* cited by examiner

UPWARDLY ANGLED BURNERS IN GLASS FURNACES

CROSS REFERENCE TO RELATED APPLICATIONS

This application claims the benefit of priority to U.S. provisional application Ser. No. 62/095,999 filed on Dec. 23, 2014, the disclosure of which is incorporated by reference herein in its entirety.

FIELD OF THE INVENTION

The present invention relates to the production of glass and more particularly to improvements in the structure and operation of glassmelting furnaces.

BACKGROUND OF THE INVENTION

In glassmelting furnaces with which the present invention is useful, fuel is combusted within an enclosure to generate heat of combustion that melts glassmaking materials which are present in the glassmelting furnace. Such glassmelting furnaces can experience any of several operational drawbacks. One such drawback is the formation of nitrogen oxides by the combustion within the glassmelting furnace. Another drawback is the possible deterioration of the interior surface of the roof (the "crown") over the furnace, which is believed to be caused by the interaction of the interior surface of the crown with volatile substances emanating from the molten glassmaking materials. The present invention provides a unique furnace structure and mode of operation which enables the reduction or avoidance of these drawbacks.

U.S. Pat. No. 6,253,578 discloses a furnace structure that reduces the risk of damage to the crown of a furnace. This structure, while useful, is potentially too limited in applicability to real-life glassmaking operations.

U.S. Pat. No. 8,256,245 discloses a glassmelting furnace in which a burner is directed toward the glassmaking materials. The present invention differs from this disclosure and is believed to provide superior operational advantages.

BRIEF SUMMARY OF THE INVENTION

One aspect of the present invention is a furnace comprising:

(A) a rear wall and a front wall which face each other, and two side walls which face each other, the four walls defining an enclosure, a crown over the enclosure and in contact with the four walls, at least one opening through which glassmaking material can be fed into the enclosure to be melted, at least one opening in the front wall through which molten glass can leave the enclosure, and a layer of molten glass within the enclosure and contacting the interiors of the four walls, wherein the distance from the top surface of the molten glass to the junction of the side walls and the crown is 3.5 to 5.5 feet; and (B) at least one burner, situated in an opening in a side wall which is between 35% and 65% of the distance from the top surface of the molten glass to the top of the side wall, wherein the burner is oriented to be able to produce a flame extending into the enclosure toward the crown that lies along a line that forms an angle of up to 15 degrees relative to a horizontal plane passing through the burner.

Another aspect of the present invention is a glassmelting method comprising:

(A) providing glassmaking material in a furnace comprising a rear wall and a front wall which face each other, and two side walls which face each other, the four walls defining an enclosure, a crown over the enclosure and in contact with the four walls, at least one opening through which material can be fed into the enclosure to be melted, at least one opening in the front wall through which molten glass can leave the enclosure, and a layer of molten glass within the enclosure and contacting the interiors of the four walls, wherein the distance from the top surface of the molten glass to the junction of the side walls and the crown is 3.5 to 5.5 feet; and (B) combusting fuel and gaseous oxidant in a burner which is situated in an opening in a side wall that is between 35% and 65% of the distance from the top surface of the molten glass to the top of the side wall, and which is oriented to produce a flame extending into the enclosure toward the crown that lies along a line which forms an angle of up to 15 degrees relative to a horizontal plane passing through the burner, and wherein the visible portions of the flame do not contact the opposing side wall, do not contact the molten glass, and do not contact the crown.

DETAILED DESCRIPTION OF THE INVENTION

Figure 1:
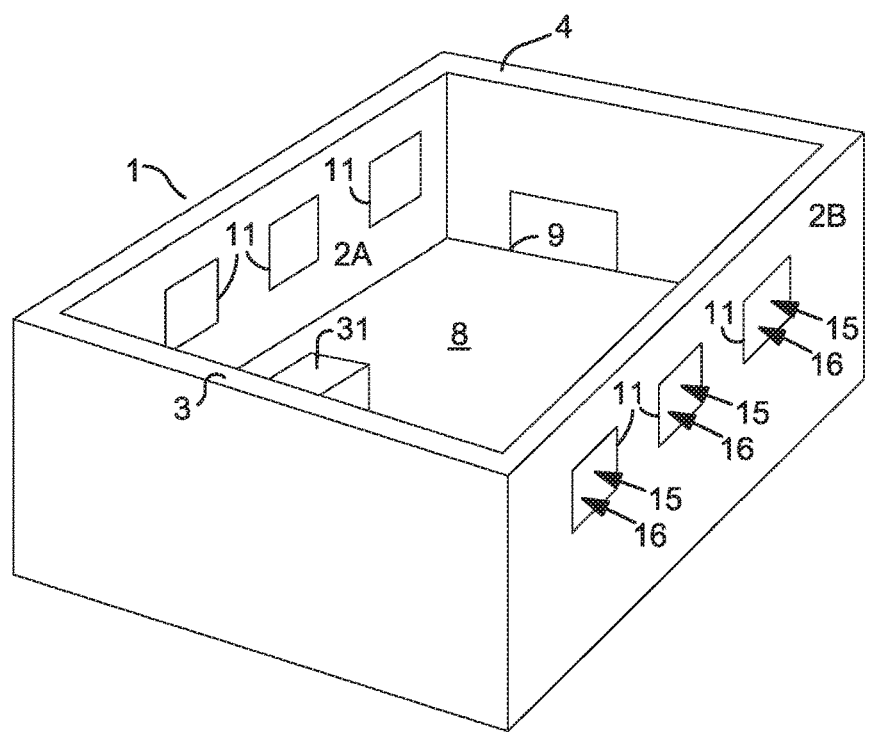
FIG. 1 is a perspective schematic view of a glassmelting furnace with which the present invention can be practiced.
Figure 2:
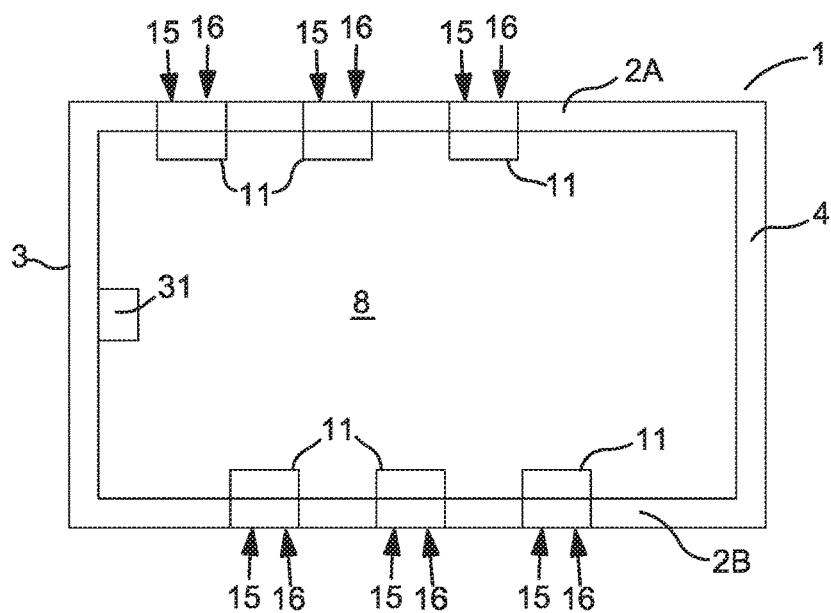
FIG. 2 is a top view of the furnace of FIG. 1.
Figure 3:
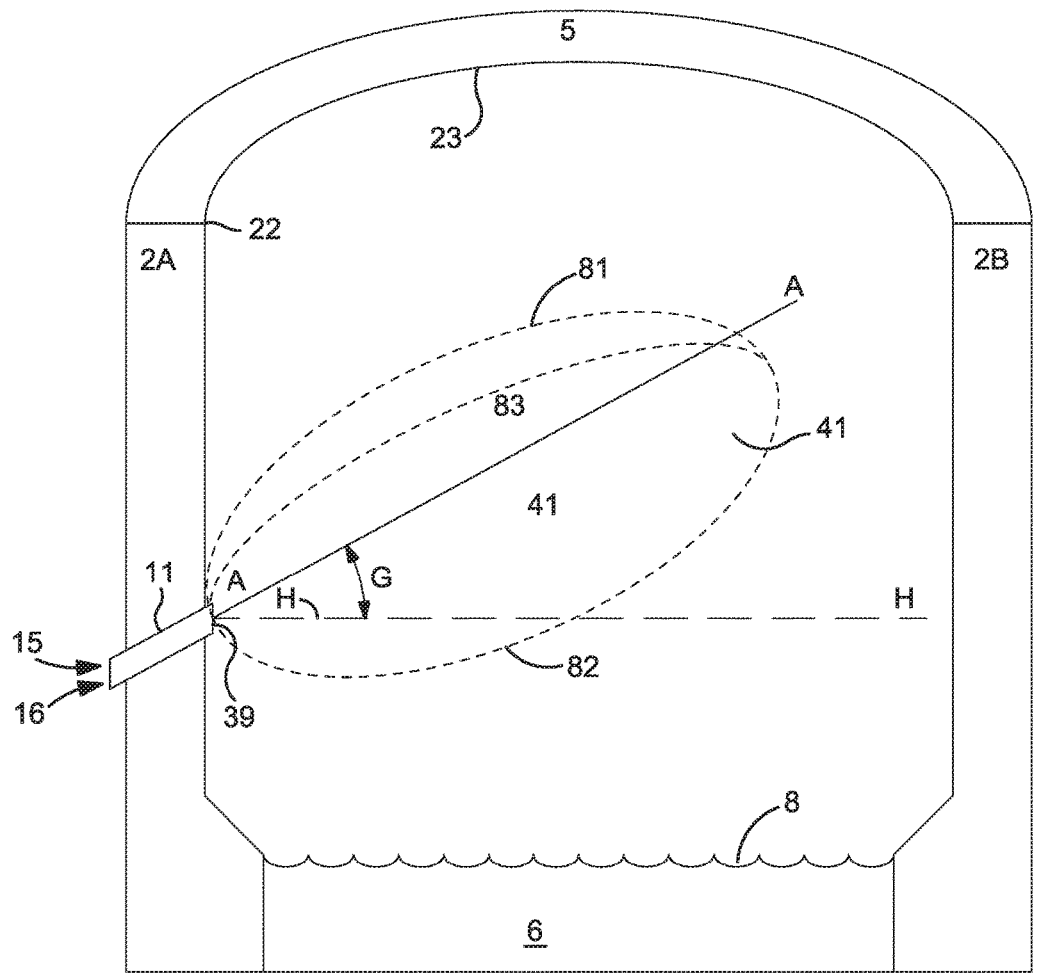
FIG. 3 is a cross-sectional view of the furnace of FIG. 1, taken along a vertical plane through a burner 11.

Referring to FIGS. 1, 2 and 3, furnace 1 is a glassmelting furnace or any other furnace in which a charge is exposed to very high temperatures provided by combustion within the furnace. Examples of other furnaces with which the present invention may be practiced include incinerators, and furnaces for melting nonferrous such as copper or aluminum, and furnaces for heating or reheating iron and steel objects such as bars, rods, and ingots.

In a glassmelting furnace, glassmaking ingredients such as soda ash, niter, silica, sodium silicate, and/or pieces of broken glass ("cullet") are fed into the furnace through feed port 31 (FIG. 2) where they are melted together to form a bath 6 of molten glass. Furnace 1 includes side walls 2A and 2B, end wall 3, and front wall 4 which includes opening 9 through which molten glass which is present in the interior of furnace 1 can flow out of furnace 1. Crown 5, which is shown in FIG. 3, abuts side walls 2A and 2B, end wall 3, and front wall 4. The top of side wall 2A and 2B is considered to be the location where the interior of the furnace changes away from the slope (usually vertical) of the side walls to the orientation of the crown interior surface 23 which can be curved (as shown in FIG. 3) or planar, such as horizontal or angled with respect to the vertical. Crown 5 is not shown in FIGS. 1 and 2, for ease of viewing the interior of furnace 1.

Furnace 1 can be provided with one burner 11 but is preferably provided with a plurality of burners 11, in side walls 2A and 2B. FIGS. 1 and 2 illustrate one of many possible embodiments of such an arrangement, with burners in opposing side walls being provided in staggered arrangement so that the burners do not directly face each other.

Each burner 11 is fed gaseous oxidant 15, and fuel 16. Suitable oxidants and fuels are described further herein.

Referring to FIG. 3, burner 11 (which as stated can be the only such burner present or is preferably one of numerous other such burners 11 in one or preferably both side walls of the furnace) situated in side wall 2A so that the distance from the top surface 8 of the molten glass 6 to the opening 39 in the side wall is 35% to 65% of the overall distance from the top surface of the molten glass 8 to the top of the side wall 2A in which opening 39 is located.

The burner or burners 11 in accordance with the present invention are installed so that the burner produces a flame which extends from the burner, at or through an opening 39 in the side wall, upward toward the crown 5, along a line A-A that forms an angle G of up to 15 degrees (preferably greater than zero degrees) relative to a horizontal plane H-H that passes through the burner. The line A-A is considered to be the imaginary line which is equidistant (equally spaced) from the outermost edges of the flame and which extends in the direction from the burner outlet into the furnace. For example, where the burner forms a wide, flat flame, the line A-A is considered to be the imaginary line which lies in the plane of the flame and is equidistant from the outer edges of the flame in the plane; and where the burner forms a conical flame, the line A-A is considered to be the imaginary line which is the axis of rotation of that conical shape. The line A-A is considered to meet the burner at an opening of the burner from which fuel and oxygen emerge and are combusted.

The line A-A along which the flame extends from the burner preferably lies in a vertical plane which is perpendicular to the side wall from which the flame extends into the furnace. That is, in a furnace in which the four walls form a rectangle, the flame preferably extends "straight across" the furnace interior towards the opposing side wall. However, this vertical plane can form an angle of up to 30 degrees relative to the side wall from which the flame extends.

In operation, each burner 11 combusts gaseous oxidant 15 and fuel 16, within the interior of furnace 1. Gaseous oxidant 15 is fed into each burner 11. Oxidant 15 is any gas or gaseous mixture that contains oxygen. One suitable oxidant 15 is air, having an oxygen content of 20.9 vol. %. Preferably, gaseous oxidant 15 has an oxygen content of at least 21 vol. %, more preferably greater than 50 vol., even more preferably greater than 85 vol. %.

The oxidant 15 having the desired oxygen content can be provided in any of several ways. It can be obtained from a separate commercial source already at the desired oxygen content. It can be obtained by combining air and a higher-content stream whose oxygen content is higher than the desired final oxygen content for oxidant 15; in this case the higher-content stream can be obtained from a separate commercial source, or can be produced by an on-site commercial air separation unit which produces a product stream having an oxygen content higher than the desired overall oxygen content of oxidant 15.

Suitable fuels 16 include any gaseous or liquid hydrocarbon, such as oil or a hydrocarbon or mixture of hydrocarbons that are liquid at standard conditions (that is, at 25 C and 1 atmosphere pressure). Preferred fuels are hydrocarbons which are gaseous at standard conditions, such as natural gas, methane, propane, and the like.

Oxidant 15, or fuel 16, or both of them, can be fed to each burner 11 from the source thereof through feed lines that are separate for each burner. Alternatively, oxidant 15, or fuel 16, or both, can be fed to multiple burners 11 through a manifold which is fed by one feed line from the source thereof.

The oxidant and the fuel are fed to the burner or burners 11 and combusted. The velocities, and the stoichiometric ratio, are provided as disclosed herein to achieve the benefits of the present invention.

The oxidant and the fuel should be fed to each burner 11 at velocities such that when the oxidant and fuel combust at the burner, no part of the visible flame that results from the combustion should contact the side wall of the furnace 1 opposite from the side wall in which the burner is located. This helps to protect the opposing side wall from excessive deterioration.

In addition, the oxidant and the fuel should be fed to the burner 11 at velocities such that no part of the visible flame that is formed by the combustion of the oxidant and the fuel contacts the surface 8 of the molten glass 6. The visible flame is depicted in FIG. 3 as flame 41.

Furthermore, the velocities at which the oxidant and the fuel are fed to burner 11 should be such that no part of the visible flame that is formed by the combustion of the oxidant and fuel contacts the interior surface of crown 5.

These conditions are satisfied by appropriately providing the respective velocities of the oxidant and the fuel. Typical examples of suitable velocities in the central pipes of the burner gas supply are an oxidant velocity in the range of 70 to 350 (ft/s) and a fuel velocity of 70 to 200 (ft/s).

The flame produced at burner 11 in accordance with this invention is characterized in that the radiative heat flux from the upper surface of the flame (seen as 81 in FIG. 3), toward the crown 5, at any given distance from the upper surface of the flame, is less than the radiative heat flux from the lower surface of the flame (seen as 82 in FIG. 3), toward the molten glass 6, at the same given distance from the lower surface of the flame.

This condition can be achieved by carrying out the combustion under conditions which promote the formation of a layer 83 at or near the top surface of the flame, in which the total amount of uncombusted fuel, partially combusted fuel, and byproducts of partial combustion of the fuel, is higher than the amount thereof in the regions of the flame below that layer. Such uncombusted fuel, partially combusted fuel, and byproducts of partial combustion, can also be referred to as "soot". This condition can be achieved by employing "staged combustion", that is, combustion wherein the fuel is fed into the furnace adjacent to where only a portion of the total amount of oxygen needed for complete combustion of the fuel is fed into the furnace, and the remaining amount of oxygen needed for complete combustion of the fuel is fed into the furnace from a greater distance away from where the fuel is fed.

Figure 4A:
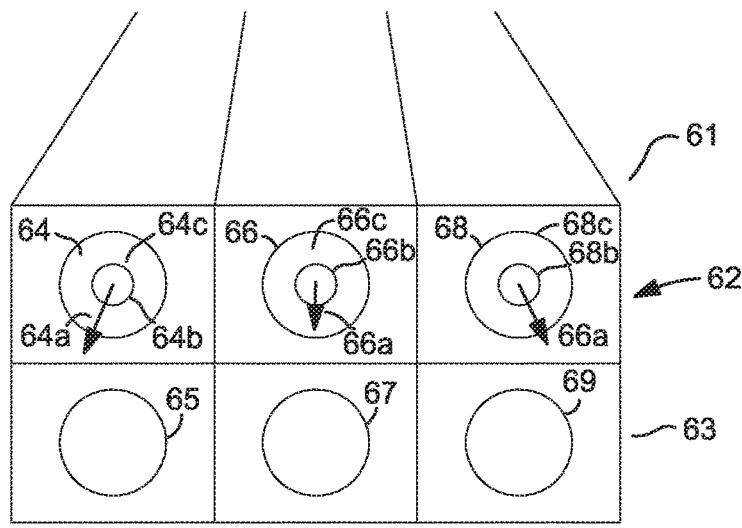
FIG. 4A is a perspective view of a burner useful in the present invention.
Figure 4B:
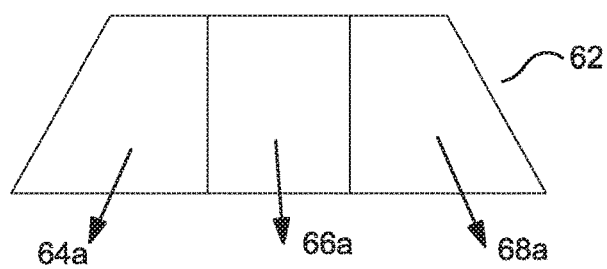
FIG. 4B is a top view of the burner of FIG. 4A.
Figure 4C:
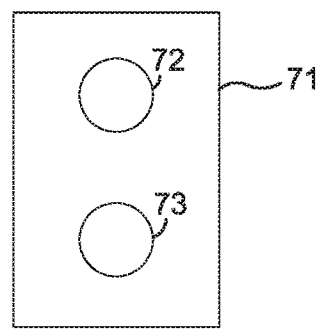
FIG. 4C is a front plan view of another burner useful in the present invention.

The formation of the desired layer 83 can be promoted by carrying out combustion with burners that feed fuel and oxidant at different elevations above the molten glass 6, wherein the fuel (and, preferably, only a portion of the oxidant for complete combustion of that fuel) is fed at an elevation above where the stoichiometric balance of the oxidant is fed. Examples of burners suitable for operation in this way are shown in FIGS. 4A, 4B and 4C. The burner of FIGS. 4A and 4B is of the type described in U.S. Pat. No. 6,132,204 and is often referred to as a wide flame burner because the flame that it typically produces is wide and relatively flat.

In FIG. 4A, burner 11 takes the form of burner 61 which includes an upper rank 62 of orifices 64, 66 and 68, and a lower rank 63 of orifices 65, 67 and 69. Orifice 64 is at the end of a passage through which is fed one or the other of oxidant or fuel, preferably oxidant. Orifice 64b is at the end of a passage through which is fed the other of oxidant or fuel, preferably fuel. Orifice 64b is within orifice 64 and is preferably concentrically situated in orifice 64, forming annular space 64c.

In similar manner, orifice 66 is at the end of a passage through which is fed one or the other of oxidant or fuel, preferably oxidant. Orifice 66b is at the end of a passage through which is fed the other of oxidant or fuel, preferably fuel. Orifice 66b is within orifice 66 and is preferably concentrically situated in orifice 66, forming annular space 66c. Orifice 68 is at the end of a passage through which is fed one or the other of oxidant or fuel, preferably oxidant. Orifice 68b is at the end of a passage through which is fed the other of oxidant or fuel, preferably fuel. Orifice 68b is within orifice 68 and is preferably concentrically situated in orifice 68, forming annular space 68c.

Preferably, as shown better in FIG. 4B, orifices 64 and 68 are oriented so that their respective axes 64a and 68a each form diverging angles relative to axis 66a of orifice 66. Orifices 65 and 69 are similarly oriented so that their respective axes (not visible in the top view of FIG. 4B) each form diverging angles relative to the axis of orifice 67.

In preferred operation of the burner of FIGS. 4A and 4B in accordance with this invention, fuel is fed to and through orifices 64b, 66b and 68b into furnace 1, and oxidant is fed to and through annular spaces 64c, 66c and 68c, into furnace 1. Oxidant is fed to and through orifices 65, 67 and 69 into furnace 1, and the fuel and oxidant combust with each other.

The desired layer 83 in accordance with the present invention is preferably realized by feeding the fuel through orifices 64b, 66b and 68b, and the oxidant through orifices 64, 66 and 68, such that the amounts of oxygen fed are in a molar excess of fuel over oxygen. Preferably, the total amount of oxygen fed through orifices 64, 66 and 68 should be less than 30% of the total amount of oxygen needed for complete combustion of the fuel that is fed. The additional amount of oxygen that is needed to complete the combustion of the fuel is in the oxidant that is fed through orifices 65, 67 and 69. The uncombusted material in layer 83 combusts in the furnace with this additional oxygen.

In FIG. 4C, burner 11 takes the form of burner 71, which includes upper orifice 72 and lower orifice 73. In preferred operation of the burner of FIG. 4C in accordance with this invention, fuel is fed to and through orifice 72 into furnace 1, and oxidant is fed to and through orifices 72 and 73 into furnace 1, and the fuel and oxidant combust with each other. The fuel fed through orifice 72 is in stoichiometric excess relative to the oxygen that is in the oxidant that is fed through orifice 72, and the stoichiometric balance of oxygen is fed through other orifices in the furnace.

The combustion in this manner results in layer 83 which shields the crown from some radiative heat transfer from the flame 81, whereas the lower portions of the flame (i.e. further from crown 5) provide desirable unimpeded radiative heat transfer to the molten glass 6. This, and the upward angle of the flame which leads to reduced velocity of furnace atmosphere at the molten glass surface, in turn protects the crown from being damaged by excessive heat, and it protects the crown from the impingement of species in the furnace atmosphere (such as having evolved from the molten glass) which could react with the crown interior surface and accelerate the undesired deterioration of that surface.

The operation in accordance with this invention also provides the advantages that there is lessened generation of nitrogen oxides and of particulate pollutants in the combustion gases.

What is claimed is:

1. A glassmelting method comprising:
   (A) providing glassmaking material in a furnace comprising a rear wall and a front wall which face each other, and two side walls which face each other, the four walls defining an enclosure, a crown over the enclosure and in contact with the four walls, at least one opening through which material can be fed into the enclosure to be melted, at least one opening in the front wall through which molten glass can leave the enclosure, and a layer of molten glass within the enclosure and contacting the interiors of the four walls, wherein the distance from the top surface of the molten glass to the junction of the side walls and the crown is 3.5 to 5.5 feet; and
   (B) feeding gaseous oxidant having an oxygen content of at least 21 vol. % and fuel to a burner which is situated in an opening in a side wall that is between 35% and 65% of the distance from the top surface of the molten glass to the top of the side wall, and which is oriented to produce a flame extending into the enclosure toward the crown that lies along a line which forms an angle of greater than zero degrees up to 15 degrees relative to a horizontal plane passing through the burner, and combusting in said burner said gaseous oxidant and said fuel that are fed to said burner, wherein the visible portions of the flame do not contact the opposing side wall, do not contact the molten glass, and do not contact the crown,
   wherein said combustion forms a layer at or near the top surface of the flame, which contains uncombusted fuel, partially combusted fuel, and byproducts of partial combustion of the fuel, and in which the total amount of uncombusted fuel, partially combusted fuel, and byproducts of partial combustion of the fuel is higher than the amount thereof in the regions of the flame below that layer.

2. A glassmelting method according to claim 1 wherein the velocity of the gaseous oxidant in the burner is 70 to 350 feet per second.

3. A glassmeltimg method according to claim 1 wherein said combustion is carried out at a burner that feeds said gaseous oxidant and said fuel at different elevations above the molten glass.

4. A glassmelting method according to claim 1 wherein said combustion is carried out at a burner that feeds said fuel and a portion of said gaseous oxidant at an elevation above where the stoichiometric balance of the gaseous oxidant is fed.

5. A glassmelting method according to claim 1 wherein said combustion is carried out at a burner that includes an upper rank of orifices each of which comprises two concentric passages and fuel is fed through one of the concentric passages and a portion of said gaseous oxidant is fed through another of the concentric passages, and a lower rank of orifices through which is fed gaseous oxidant.

* * * * *